US012639889B2

(12) United States Patent
Robert et al.

(10) Patent No.: US 12,639,889 B2
(45) Date of Patent: May 26, 2026

(54) LOCALIZATION OF LIGHT SOURCES USING REFERENCE VIEWPOINTS

(71) Applicant: InterDigital Madison Patent Holdings, SAS, Paris (FR)

(72) Inventors: Philippe Robert, Rennes (FR); Salma Jiddi, Casablanca (MA); Tao Luo, Cesson-Sevigne (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 55 days.

(21) Appl. No.: 18/370,306

(22) Filed: Sep. 19, 2023

(65) Prior Publication Data

US 2024/0013478 A1      Jan. 11, 2024

Related U.S. Application Data

(63) Continuation of application No. 16/980,319, filed as application No. PCT/EP2019/055885 on Mar. 8, 2019, now abandoned.

(51) Int. Cl.
*G06T 15/50*      (2011.01)
*G06T 7/20*      (2017.01)
(Continued)

(52) U.S. Cl.
CPC .............. *G06T 15/506* (2013.01); *G06T 7/20* (2013.01); *G06T 7/74* (2017.01);
(Continued)

(58) Field of Classification Search
CPC .......... G06T 15/506; G06T 15/60; G06T 7/74
See application file for complete search history.

(56) References Cited

U.S. PATENT DOCUMENTS 9,613,454 B2      4/2017  Karsch et al.
2007/0236514 A1*  10/2007  Agusanto ............. G06T 19/006
345/646
(Continued)

FOREIGN PATENT DOCUMENTS

CN      103797443 A      5/2014
EP      2887321 A1      6/2015
(Continued)

OTHER PUBLICATIONS

International Search Report and Written Opinion of the International Searching Authority for PCT/EP2019/055885 mailed Apr. 15, 2019 (10 pages).—* cited in parent.
(Continued)

*Primary Examiner* — Yi Yang
(74) *Attorney, Agent, or Firm* — Smadar Gefen

(57)      ABSTRACT

A method and an apparatus for processing a 3D scene are presented. Techniques are disclosed for determining light source locations, including tracking a current viewpoint of a camera capturing object(s) in a 3D scene and determining a reference viewpoint relative to the current viewpoint of the camera. According to aspects, a light source location is determined by obtaining a registered map of real cast shadows of the object(s) from an input image captured by the camera, registered with respect to the reference viewpoint. Then, for candidates of light sources, obtaining respective maps of virtual shadows of the object(s) created with respect to the reference viewpoint, and determining the location of the light source based on the candidates of light sources with respective maps of virtual shadows that match the registered map of real cast shadows.

18 Claims, 8 Drawing Sheets

(51) Int. Cl.
    *G06T 7/73*           (2017.01)
    *G06T 15/60*        (2006.01)

(52) U.S. Cl.
    CPC .............. *G06T 2207/30241* (2013.01); *G06T 2215/12* (2013.01); *G06T 2215/16* (2013.01)

(56)            References Cited

U.S. PATENT DOCUMENTS

| | | | |
|---|---|---|---|
| 2008/0231631 A1 | 9/2008 | Matsumura et al. | |
| 2009/0128552 A1* | 5/2009 | Fujiki ................... | G06T 19/006 |
| | | | 345/419 |
| 2011/0234631 A1* | 9/2011 | Kim ........................ | G06T 15/60 |
| | | | 345/632 |
| 2012/0063680 A1* | 3/2012 | Daisy ................... | G06T 15/205 |
| | | | 382/165 |
| 2013/0308002 A1* | 11/2013 | Jiang .................... | H04N 23/683 |
| | | | 348/208.6 |
| 2014/0232631 A1 | 8/2014 | Fleischmann et al. | |
| 2015/0009216 A1 | 1/2015 | Watanabe | |
| 2015/0156415 A1 | 6/2015 | Gallup et al. | |
| 2016/0307032 A1 | 10/2016 | Butler et al. | |
| 2016/0309084 A1 | 10/2016 | Venkataraman et al. | |
| 2017/0001333 A1* | 1/2017 | Tanaka .................. | B28B 11/007 |
| 2017/0171570 A1 | 6/2017 | Mitsumoto | |
| 2018/0012392 A1 | 1/2018 | Kryachko et al. | |
| 2018/0061071 A1 | 3/2018 | Okutani et al. | |
| 2018/0129909 A1 | 5/2018 | Tsutsumi et al. | |

FOREIGN PATENT DOCUMENTS

| | | |
|---|---|---|
| EP | 3352137 A1 | 7/2018 |
| JP | H08153213 A | 6/1996 |
| JP | 2001052208 A | 2/2001 |
| WO | WO03017204 A2 | 2/2003 |

OTHER PUBLICATIONS

International Preliminary Report on Patentability for PCT/EP2019/ 055885 mailed Sep. 15, 2020 (7 pages).—* cited in parent.

Jiddi et al., "[Poster] Illumination Estimation Using Cast Shadows for Realistic Augmented Reality Applications", 2017 IEEE International Symposium on Mixed and Augmented Reality (ISMAR-Adjunct), pp. 192-193.—* cited in parent.

Zhang et al., "Illumination Decomposition for Photograph With Multiple Light Sources", IEEE Transactions On Image Processing, vol. 26, No. 9, Sep. 2017, pp. 4114-4126.

Lopez-Moreno et al., "Multiple light source estimation in a single image", vol. xx (200y), No. z, Computer Graphics Forum | vol. 32, No. 8 | 170-82, Dec. 2013, pp. 1-12.

Panagopoulos, et al., "Robust Shadow and Illumination Estimation Using a Mixture Model", Image Analysis Lab, Computer Science Dept., Stony Brook University, NY, USA, IEEE Conference on Computer Vision and Pattern Recognition (CVPR2), 2009, 8 pages.

Chen et al., "Single image based illumination estimation for lighting virtual object in real scene", State Key Laboratory of Virtual Reality Technology and Systems School of Computer Science and Engineering, Beihang University, Beijing, China, 12th International Conference on Computer-Aided Design and Computer Graphics, 2011, 6 pages.

* cited by examiner

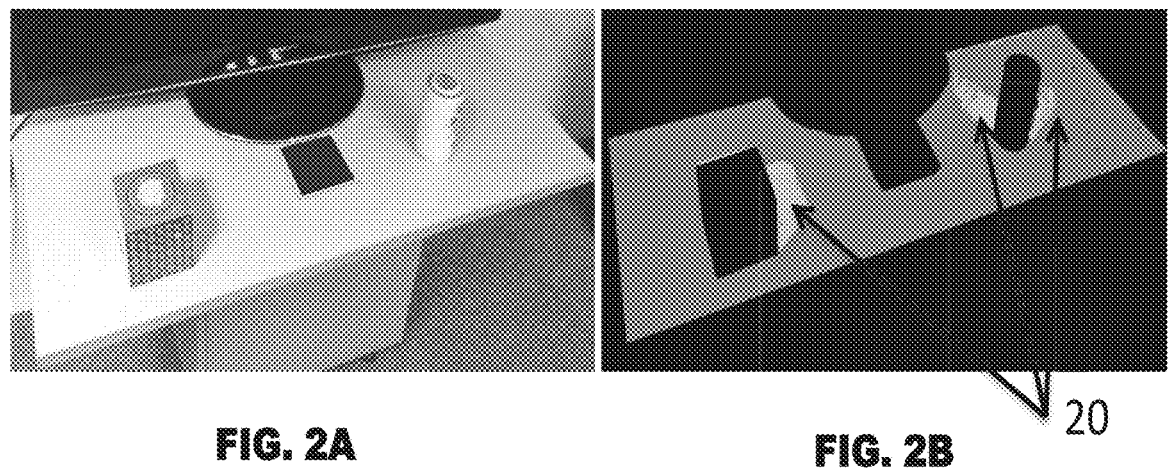
FIG. 2A            FIG. 2B
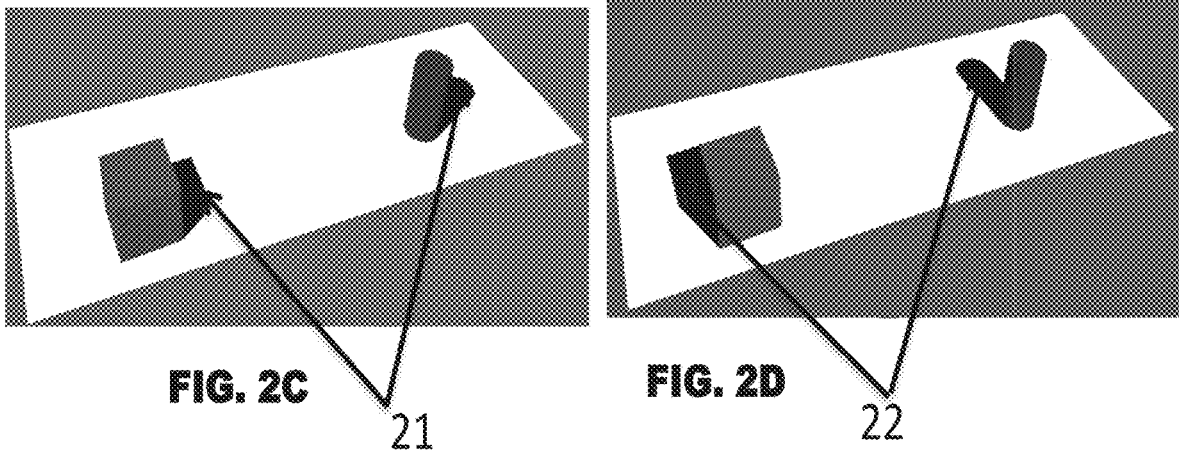
FIG. 2C            FIG. 2D

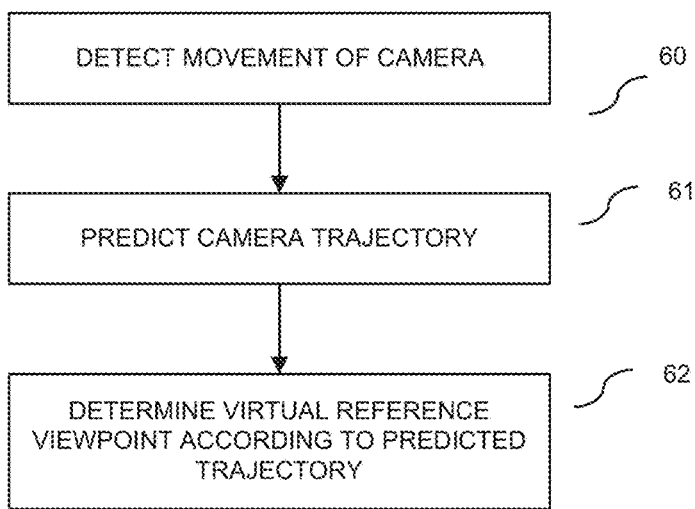

DETECT MOVEMENT OF CAMERA — 60

PREDICT CAMERA TRAJECTORY — 61

DETERMINE VIRTUAL REFERENCE VIEWPOINT ACCORDING TO PREDICTED TRAJECTORY — 62

FIG. 6A

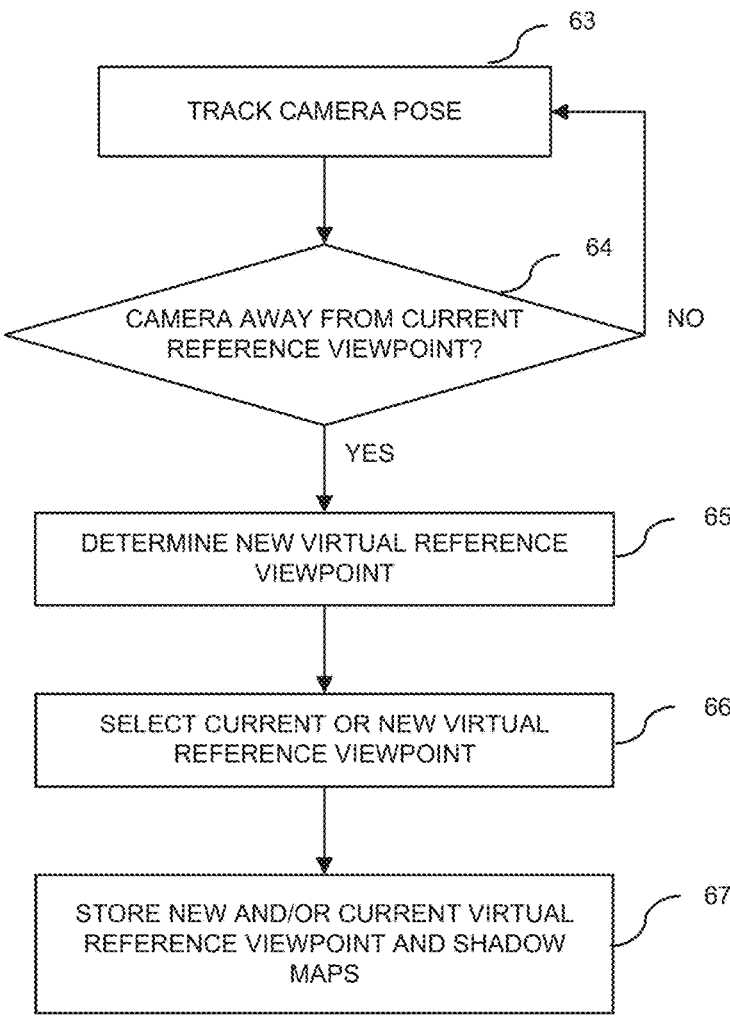

TRACK CAMERA POSE — 63

CAMERA AWAY FROM CURRENT REFERENCE VIEWPOINT? — 64    NO

YES

DETERMINE NEW VIRTUAL REFERENCE VIEWPOINT — 65

SELECT CURRENT OR NEW VIRTUAL REFERENCE VIEWPOINT — 66

STORE NEW AND/OR CURRENT VIRTUAL REFERENCE VIEWPOINT AND SHADOW MAPS — 67

FIG. 6B

LOCALIZATION OF LIGHT SOURCES USING REFERENCE VIEWPOINTS

CROSS REFERENCE TO RELATED APPLICATIONS

The present application is a continuation of U.S. Non-Provisional patent application Ser. No. 16/980,319, filed Sep. 11, 2020, which is a National Phase entry under 35 U.S.C. § 371 of International Application No. PCT/EP2019/055885, filed Mar. 8, 2019, which claims the benefit of EP Patent Application No. 18305266.1, filed Mar. 13, 2018, all are incorporated herein by reference in their entirety.

TECHNICAL FIELD

The present disclosure relates to 3D scene lighting for mixed reality. More particularly, the present disclosure relates to virtual object lighting inserted into a 3D real scene.

BACKGROUND

In mixed reality, that is when virtual objects are inserted into a 3D model of a real scene, 3D lighting of the virtual objects is a key feature in order to provide a realistic aspect of the 3D scene. The virtual objects should be lighted correctly by imitating the real lighting of the scene. However, lighting environment may change dynamically. Therefore, 3D lighting of a real scene has to be continuously estimated. But lighting is a time-consuming task in real-time rendering and needs to be drastically simplified in particular when rendered on a mobile device. Therefore, a compromise must be found between complex modeling and graphics rendering time. Therefore, there is a need for a new method that can model complex indoor dynamic scene light sources.

SUMMARY

According to an aspect of the present disclosure, a method for processing a 3D scene is disclosed. Such a method comprises determining at least one virtual reference viewpoint in the 3D scene, obtaining a map of registered real cast shadows of objects in the 3D scene from an input image captured by a camera positioned at a viewpoint distinct from the virtual reference viewpoint, said map of real cast shadows being registered with regards to the virtual reference viewpoint, determining parameters for at least one light source in the 3D scene using the map of registered real cast shadows and at least one map of virtual shadows of objects in the 3D scene cast by the at least one light source from the virtual reference viewpoint.

According to another aspect of the present disclosure, an apparatus for processing a 3D scene is also disclosed. Such an apparatus comprises means for determining at least one virtual reference viewpoint in the 3D scene, means for obtaining a map of registered real cast shadows of objects in the 3D scene from an input image captured by the camera positioned at a viewpoint distinct from the virtual reference viewpoint, said map of real cast shadows being registered with regards to the virtual reference viewpoint, means for determining parameters for at least one light source in the 3D scene using the map of registered real cast shadows and at least one map of virtual shadows of objects in the 3D scene cast by the at least one light source from the virtual reference viewpoint.

BRIEF DESCRIPTION OF THE DRAWINGS

FIG. 2A illustrates an image of a 3D scene.

FIG. 2B illustrates cast shadows of objects in the 3D scene from the image illustrated by FIG. 2A.

FIG. 2C illustrates an image of the 3D scene rendered with a point light source.

FIG. 2D illustrates another image of the 3D scene rendered with another point light source.

FIG. 6A illustrates an exemplary method for determining a virtual reference viewpoint according to an embodiment of the present disclosure.

FIG. 6B illustrates an exemplary method for determining a virtual reference viewpoint according to another embodiment of the present disclosure.

DESCRIPTION OF EMBODIMENTS

In order to correctly light a virtual scene, rendering correctly lit virtual objects and faithfully rendering shadows cast by the virtual objects onto the real scene is essential. Two main features contribute to the realism of the shading and of the cast shadows: the 3D location/orientation of the shadows and their strength given by the attenuation of the color intensity of the shaded surface.

In presence of hard shadows, a set of virtual lighting models exists: point lights, spot lights or directional lighting.

In the embodiments disclosed herein, lighting is modeled by a set of 3D point light sources. The 3D location of such source light points and the shadow attenuation associated to each source light point can be estimated from a unique video camera observing the real scene.

It should be noted that lighting conditions in a real scene are not stable and change continuously. Therefore, for improving the realism of mixed reality, lighting environment has to be estimated continuously.

In order to estimate the 3D location of the light sources in the real scene, the real scene is analyzed via image processing.

Figure 1:
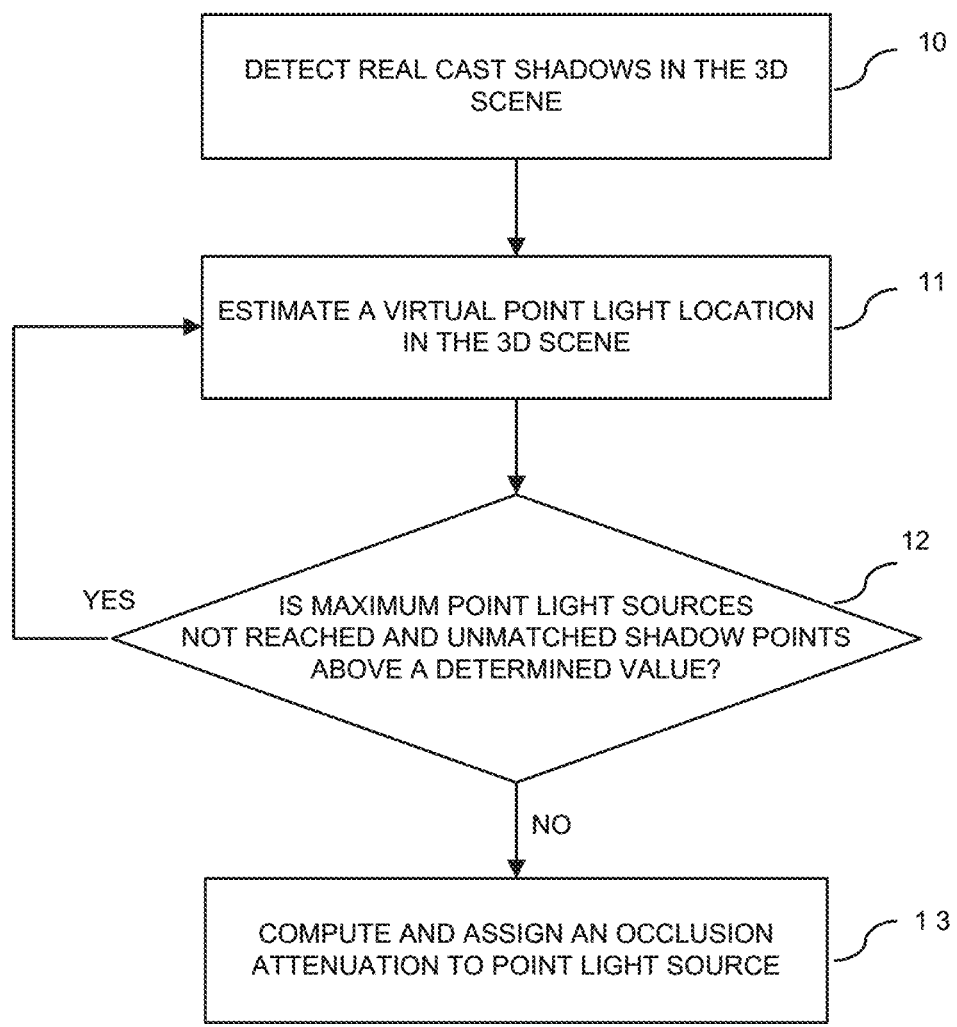
FIG. 1 illustrates an exemplary method for determining 3D position of candidates point light sources of the 3D scene according to an embodiment of the present disclosure.

FIG. 1 illustrates an exemplary method for light sources location determination.

It is assumed that a 3D geometric model of the real scene is available as well as an image of the scene captured from an input video camera with known 3D pose in the 3D model coordinate system. The 3D pose of the input video camera not only comprises the 3D location of the input video camera in the 3D model coordinate system, but also intrisic camera parameters.

For instance, location in the 3D scene of point light sources is determined for point light sources from a set of candidate point light sources. Such a set of 3D point light sources can be a list of 3D poses or a structured tree of 3D locations.

In step 10, real cast shadows are detected in an input RGB (Red Green Blue) image of the scene obtained for the input video camera. Real cast shadows correspond to shadows of the real objects present in the scene cast by the real light sources and captured by the input video camera.

FIG. 2A illustrates an example of an input RGB image. FIG. 2B illustrates corresponding cast shadows detected in the input image. On FIG. 2B, detected cast shadows appear in light grey and are identified by the arrows pointing from the reference 20.

In step 11, for a candidate light source, the virtual shadow obtained by the candidate light source are matched with the detected cast shadows.

In order to do so, in step 11, a rendered image is obtained for the candidate point light source. Such a rendered image may be obtained by any known method for 3D rendering cast shadows from the candidate point light source. The rendered image comprises shadows cast by the associated candidate point light source from the set of point light sources.

FIGS. 2C and 2D illustrates examples of images rendered with different point light sources, and using the viewpoint in the 3D scene as the viewpoint of the input video camera, similar as the viewpoint used for obtaining the input RGB image.

It can be seen on FIGS. 2C and 2D that cast shadows, respectively 21 and 22, depend on the location of the 3D point light source used to render the image. On FIG. 2C, the 3D point light source is located on the left of the projected scene, while on FIG. 2D, the 3D point light source is located on the right of the projected scene.

Then, in step 11, the rendered image is matched with the mask of real cast shadows detected at step 10. Matching the rendered image with the detected real cast shadow may be carried out via the computation of correlation between the binary mask of the detected real cast shadows and the binary mask of the virtual shadows cast by the candidate 3D point light source.

The 3D position of the point light source corresponds to the 3D location of the candidate point light source.

In step 11, once the location of a candidate point light source is determined, matched pixels that match both the mask of detected real cast shadows and the virtual cast shadows obtained from the candidate point light source are marked so as to discard those pixels when estimating other point light sources location.

When estimating other point light sources, in step 11, the pixels that have been marked in determining previous point lights are discarded.

In step 12, it is verified if a maximum number of point light sources have not yet been determined, and if the number of unmatched real shadow points is above a determined value.

For instance, a maximum of point light sources may correspond to a maximum number of point light sources that can be satisfactorily processed by the rendering engine.

If both conditions cited above are true, one more point light source is selected from the set of candidates 3D point light sources and added to the 3D scene. The matching operation is repeated for the new 3D point light source (step 11). It should be noted that when repeating the matching operation for a new 3D point light source, the detected real shadow points that match virtual shadow points cast from a 3D point light source previously determined are discarded.

When at least one condition among the two conditions cited above is false, 3D point light sources location determination ends, and in step 13, an occlusion attenuation is computed and assigned to each 3D point light source determined in step 11.

From the exemplary method discussed above, it can be seen that a virtual shadow map, i.e. a map of shadows cast by a candidate 3D light source point, has to be computed for each candidate source light. Thus, the creation of the set of virtual shadow maps is expensive.

Moreover, these maps are associated to a particular viewpoint that corresponds to the input video camera viewpoint that captures an image of the real scene. If the lighting environment is stationary and if the geometry of the scene is static, the lighting determination discussed above can be carried out off-line. But on the other hand, if the lighting environment is dynamic, the lighting determination must be done continuously on-line.

Furthermore, light sources are determined depending on the input video camera viewpoint. When the input video camera viewpoint changes, cast shadows, real and virtual, change.

Figure 3A:
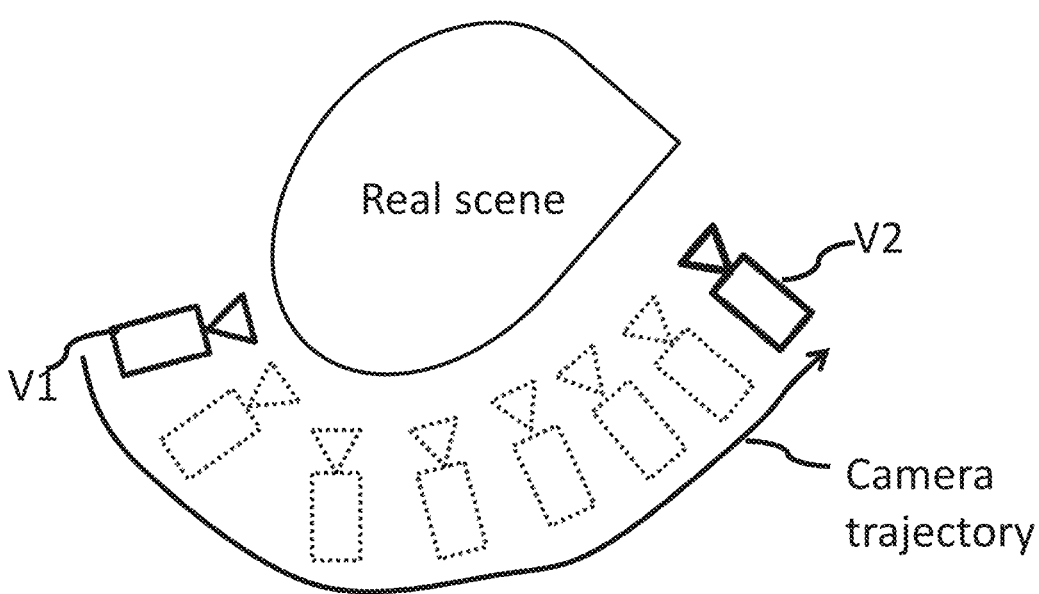
FIG. 3A illustrates different viewpoints for capturing a real scene from a camera embeded in mobile device.

Such a problem may appear, for instance, when the 3D scene processing discused above is used for mixed reality applications provided on mobile devices, such as mobile phones, tablets, etc. . . . . In such applications, the real scene may be captured by the video camera of the mobile device. The user of the mobile device may move the mobile device, and thus the input video camera viewpoint may change. For instance, as illustrated on FIG. 3A, the input video camera may capture the real scene from a first viewpoint V1. The user then moves with the mobile device, on the right, towards the viewpoint V2, the real scene is then continuously captured from the successive viewpoints along the input video camera trajectory.

In that case, as light sources have to be continuously determined and the viewpoint of the input video camera changes, the set of virtual shadow maps must be continuously updated. However, the computation of numerous shadow maps is time-consuming. So, an objective of the present disclosure is to limit the occurrence of shadow maps computation.

According to the principles presented here, virtual reference viewpoints are introduced in the 3D scene. The set of virtual shadow maps is thus created with respect to the virtual reference viewpoints. As long as the input video camera remains close to a virtual reference viewpoint, the virtual shadow maps created in regards with this virtual reference viewpoint are used in the lighting parameters determination process.

In the particular case where the moving camera locations are roughly known, a set of virtual reference viewpoints can be pre-defined and the corresponding shadow maps can be pre-computed. On the other hand, if the camera motion cannot be controlled, the virtual reference viewpoints must be defined on the fly.

In this latter case, when the input video camera moves and reaches a position where the current virtual reference viewpoint is no more valid, a new virtual reference viewpoint is defined and a new set of virtual shadow maps is created. The new virtual reference viewpoint may be selected for instance as the new location of the input video camera.

Figure 3B:
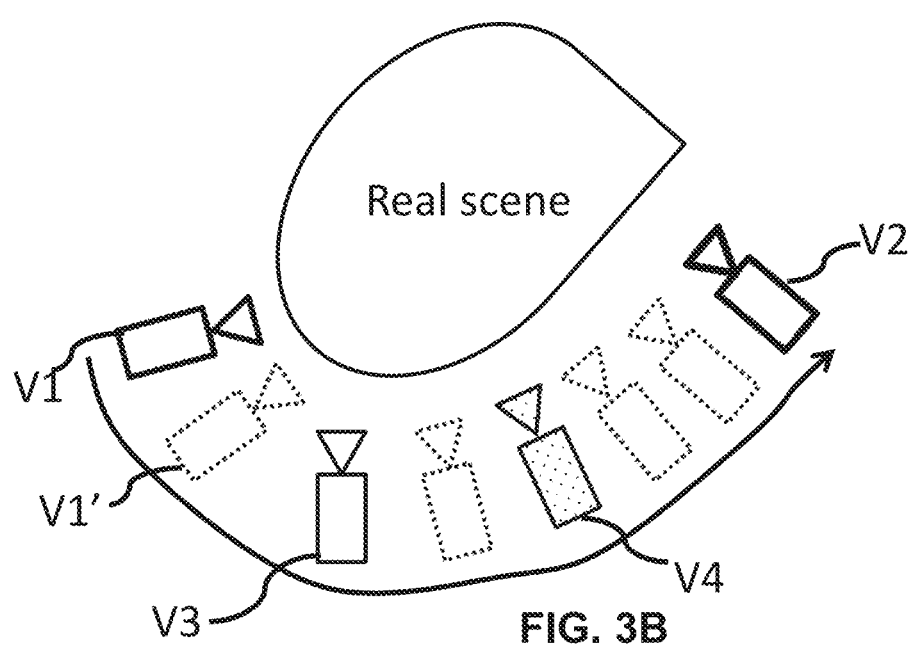
FIG. 3B illustrates virtual reference viewpoints introduced in the 3D scene.

FIG. 3B illustrates exemplary locations V1, V3, V4, V2, for virtual reference viewpoints introduced in the 3D scene.

According to an embodiment of the present principle, the virtual reference viewpoints may correspond to viewpoints of a multi-view image capture. In this way, camera parameters and location are already known.

Figure 4:
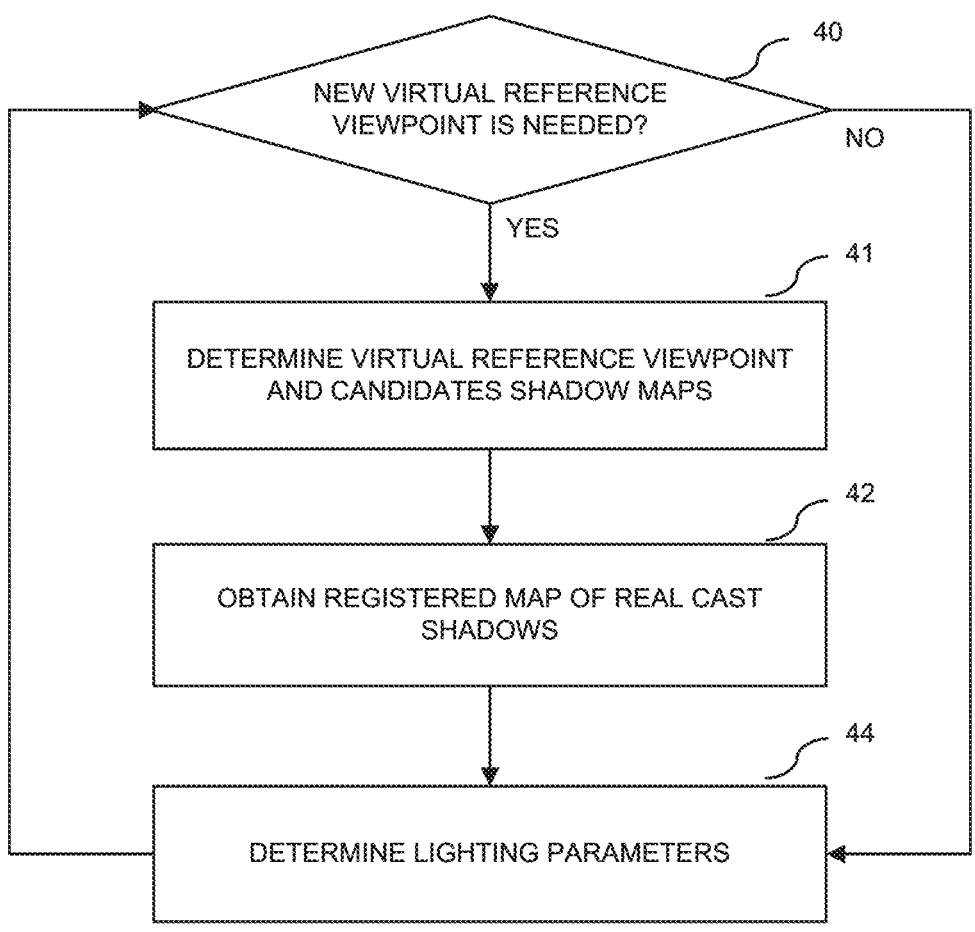
FIG. 4 illustrates an exemplary method for processing a 3D scene according to an embodiment of the present disclosure.

According to the principles presented here, lighting parameters determination (step 11 from FIG. 1) is modified as follows. FIG. 4 illustrates an exemplary method for lighting parameters determination according to an embodiment of the present disclosure.

The real scene is captured by a camera from a first viewpoint, which will be called the input video camera viewpoint in the following. For instance the mobile device is located at the viewpoint V1' in the 3D scene as illustrated on FIG. 3B.

During the 3D scene rendering process, virtual cast shadows maps are determined with respect to a current virtual reference viewpoint. At the beginning of the rendering process, the current virtual reference viewpoint corresponds to the input video camera viewpoint as the input video camera may have not yet been moved by the user. Virtual cast shadows maps are determined as discussed above in reference with FIG. 1.

In a particular case, it may be asked the user to begin at a rough location from which a pre-processed reference viewpoint can be used with its pre-computed shadow maps.

In step 40, it is checked whether a new virtual reference viewpoint is needed for lighting parameters determination.

According to an embodiment of the present disclosure, a new virtual reference viewpoint is needed if the viewpoint of the input video camera and the current virtual reference viewpoint do not satisfy a determined criterion. For instance, a new virtual reference viewpoint is determined if a number of pixels overlapping in an image captured from the current virtual reference viewpoint and an image captured from the current viewpoint of the input video camera is below a determined value. As an example, the pixels are declared "overlapping" if after registration of one of the two images on the other, the distance between two co-located pixels in terms of absolute difference of depth is below a threshold.

According to another example, a new virtual reference viewpoint is determined if a number of pixels from an image captured from the current virtual reference viewpoint having no corresponding point in the image captured from the current viewpoint of the input video camera is above a determined value.

According to another embodiment of the present disclosure, a new virtual reference viewpoint is needed if the distance between the input video camera viewpoint and the current virtual reference viewpoint is above a determined value. Such a determined value may depend on the complexity of the real scene, taking into account for instance the number of objects in the scene, the number and locations of the 3D light sources, etc . . . .

If a new virtual reference viewpoint is needed, at step 41, a new virtual reference viewpoint is determined and the underlying candidate shadow maps are obtained.

If the new virtual reference viewpoint has been previously used or if the new virtual reference viewpoint has been previously determined and added to a set of available virtual reference viewpoints, its underlying candidate shadow maps may have been previously computed and stored. In that case, the candidate shadow maps associated to the new virtual reference viewpoint are retrieved from memory.

If the candidate shadow maps associated to the new virtual reference viewpoint have not yet been computed, they are computed for instance as discussed above with FIG. 1. A candidate shadow map is thus obtained for each of the candidate point light source using any known method for 3D rendering cast shadows.

For instance, the new virtual reference viewpoint is selected among a set of candidates viewpoints whose location is known. In the example of FIG. 3B, the set may comprise the viewpoints V1-V4.

According to an embodiment of the present disclosure, the virtual reference viewpoint among the set of candidates viewpoints is selected as the closest viewpoint from the current input video camera viewpoint.

According to another embodiment of the present disclosure, the virtual reference viewpoint among the set of candidates viewpoints is selected as a viewpoint for which a number of pixels overlapping in an image captured from the candidate viewpoint and the image captured from the current input video camera viewpoint is above a determined value. The selected viewpoint may be the candidate viewpoint having the most pixels overlapping with the input video camera viewpoint.

It has been assumed above that a set of virtual reference viewpoints is available among which a satisfying reference viewpoint can be identified whatever the current input video camera viewpoint is. This can be the case if the space of locations and orientations of the input video camera viewpoints is a priori known. Otherwise, if for example the camera motion cannot be controlled, the reference viewpoint and the underlying candidate shadow maps are defined on the fly. FIG. 6B discussed below discloses an exemplary method for determining virtual reference viewpoints on the fly, according to an embodiment of the present disclosure.

In step 42, a new map of registered real cast shadows is obtained. The real cast shadows are the shadows cast by the real light sources from the real objects in the real scene. The real cast shadow map is obtained from an input image captured by the input video camera at the current time instant. As the current viewpoint of the input video camera may be distinct from the new virtual reference viewpoint, the real cast shadow map has to be registered with regards to the new virtual reference viewpoint.

The current map of registered real cast shadows is continuously updated due to the fact that lighting may have changed or real camera may have moved, and consequently cast shadows detected in the current real viewpoint may have changed.

In step 44, lighting parameters are determined using the current registered real cast shadow map and maps of virtual shadows cast by 3D point light sources and associated to the current virtual reference viewpoint. A map of virtual shadows is generated for each candidate 3D point light source, with respect to the current virtual reference viewpoint.

Lighting parameters are determined as discussed above in relation with FIG. 1, each map of virtual shadows is matched with the map of registered real cast shadows obtained at step 42. And the map of virtual shadows that best matches the map of registered real cast shadows is selected. The 3D point light source associated to the selected map of virtual shadows is selected as a 3D point light source. This step is iterated with other maps of virtual shadows for selecting other 3D point light sources. Pixels from the map of registered real cast shadows that have been marked as matching a previous map of virtual shadows are discarded in the matching process for the subsequent 3D point light source determination.

Figure 5A:
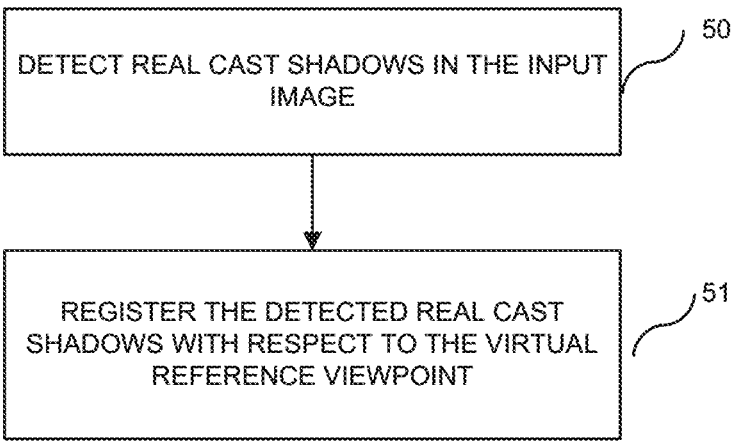
FIG. 5A illustrates an exemplary method for obtaining a map of registered real cast shadows according to an embodiment of the present disclosure.

FIG. 5A illustrates an exemplary method for obtaining a map of registered real cast shadows according to an embodiment of the present disclosure.

According to this embodiment, in step 50, the real cast shadows are detected in the image captured from the input video camera, in a similar manner as discussed above with FIG. 1. A map of detected real cast shadows is thus obtained. Such a map reflects the real cast shadows from the input video camera viewpoint.

In step 51, the map of detected real cast shadows is registered with regards to the current virtual reference viewpoint. Such a registration is carried out by determining for each pixel of the map of detected real cast shadows, a corresponding pixel or pixels in the registered real cast shadows map. This can be done by determining the 3D point in the 3D scene that corresponds to the pixel projected in map of detected real cast shadows. The determined 3D point in the 3D scene is then projected in the current virtual reference viewpoint. The pixel in the registered real cast shadows map corresponding to the pixel in the map of detected real cast shadows is set to the same binary value, for instance 0 if the pixel is a detected shadow pixel, 1 if the pixel is not a detected shadow pixel.

Figure 5B:
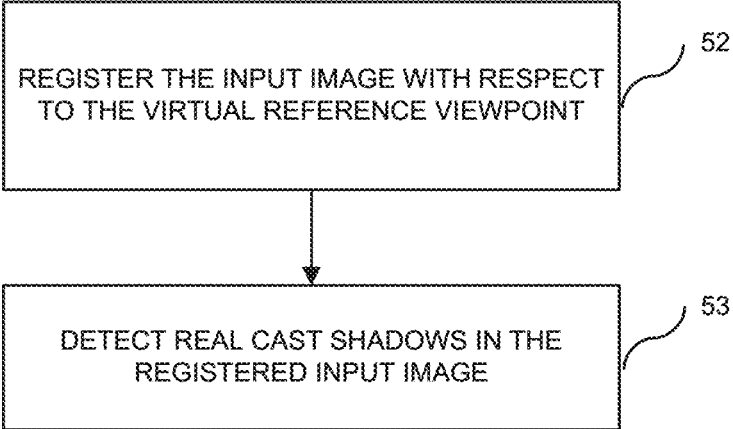
FIG. 5B illustrates an exemplary method for obtaining a map of registered real cast shadows according to another embodiment of the present disclosure.

FIG. 5B illustrates an exemplary method for obtaining a map of registered real cast shadows according to another embodiment of the present disclosure.

According to this embodiment, in step 52, the image captured by the input video camera is registered with regards to the current virtual reference viewpoint. This can be carried out in a same way as discussed above, by projecting the pixels in the 3D space and then projecting the 3D points with regards to the current virtual reference viewpoint. A registered input image is thus obtained.

In step 53, real cast shadows are then detected in the registered input image obtained at step 52.

FIG. 6A illustrates an exemplary method for determining a virtual reference viewpoint according to an embodiment of the present disclosure.

According to this embodiment, a new virtual reference viewpoint may be determined in advance before this new virtual reference viewpoint is needed for lighting parameters determination. According to this embodiment, the camera trajectory may be predicted. A new virtual reference viewpoint is determined in advance according to the trajectory of the camera and virtual shadows map can be determined in advance according to this new virtual reference viewpoint. In that way, when the current virtual reference viewpoint is no more valid, the new virtual reference viewpoint determined in advance can be used.

According to this embodiment, in step 60, movement of the camera capturing the real scene is detected.

In step 61, the camera trajectory is predicted by extrapolating the movement of the camera.

In step 62, the new virtual reference viewpoint is determined according to the predicted camera trajectory. A multi-view viewpoint on the camera trajectory may be selected or a viewpoint close to the camera trajectory.

Virtual shadows maps can then be determined and stored for future use.

FIG. 6B illustrates an exemplary method for determining a virtual reference viewpoint according to another embodiment of the present disclosure. According to this embodiment, virtual reference viewpoints are determined on the fly, to anticipate the fact that a new virtual reference viewpoint may be needed by the system disclosed with FIG. 4.

A new reference viewpoint can be defined as one of the last real input video camera viewpoints or the current real input video camera viewpoint or a virtual viewpoint corresponding for example to an average location and orientation of the last real input video camera viewpoints. As the computation of the corresponding virtual shadow maps is time-consuming, anticipation is required.

In step 63, camera pose is tracked continuously.

In step 64, it is checked whether the camera is moving away from the current reference viewpoint from more than a threshold. For instance, a distance between the current virtual reference viewpoint and the camera's viewpoint is determined, and it is checked whether this distance is above a determined value. According to a variant, it could be checked if a number of pixels overlapping in an image captured from the current virtual reference viewpoint and an image captured from the camera's viewpoint is below a determined value. In that case, it is considered that the camera has moved away from the current reference viewpoint from more than the threshold. Such overlapping measurements on successive viewpoints can allow to evaluate the trend and predict the evolution of the overlapping measure in order to take a better decision with respect to the possible introduction of a new reference viewpoint.

If this is the case, in step 65, a new reference viewpoint is determined, for example at the current real camera pose. The virtual shadow maps associated to the new reference viewpoint are computed.

While this new reference viewpoint is being defined, the current reference virtual viewpoint is still used for lighting parameters determination. So, the threshold used at step 64 is chosen so that beyond it, it is still possible to use the current reference viewpoint while the virtual shadow maps of the new reference viewpoint are being computed.

When the new reference viewpoint is ready, at step 66, the two reference viewpoints (current reference viewpoint and new reference viewpoint) poses are compared with the current real camera pose and the reference viewpoint that is closest to the current real camera pose is selected. The selected reference viewpoint is then used in the process for lighting parameters determination as disclosed with FIG. 4.

At step 67, the reference virtual viewpoints and their corresponding shadow maps can also be stored to be used later, so that they enrich the set of available reference virtual viewpoints. In this context, the selection is mixed: either a reference virtual viewpoint is selected among available ones if a satisfying one exists or a new one is computed and then stored.

The virtual reference viewpoint may be selected to be close to the area where the video camera moves, in order to minimize the effect of the error on the 3D position of the virtual reference viewpoint and consequently the errors on the registered real shadow map. It can be for example a real viewpoint selected once it is captured. The selected virtual viewpoint can then be kept as long as for example the overlapping between the real and virtual viewpoint images is more than a percentage of pixels.

A condition to change the virtual reference viewpoint is that the system had time to generate new virtual shadow maps corresponding to the next virtual reference viewpoint.

The creation of the virtual maps for a new virtual reference viewpoint can also be carried out in a coarse to fine mode by guaranteeing first that the 3D space is covered with distant light positions and by then progressively introducing new light positions. In this mode, once a new virtual viewpoint is selected, the determination of lighting paramters is first carried out with a subset of virtual shadow maps, leading possibly to a coarse estimate of the light positions. Then, as new virtual shadow maps are created, the estimation can be more accurate.

In the description above, it has been assumed that the geometry of the observed 3D scene is not changing significantly. On the other hand, if a part of the scene is modified, e.g. an object is moved, inserted or removed, scene geometry changes should be detected and taken into account for the computation of the shadow maps associated to a virtual reference viewpoint and the lighting parameters determination.

Figure 7:
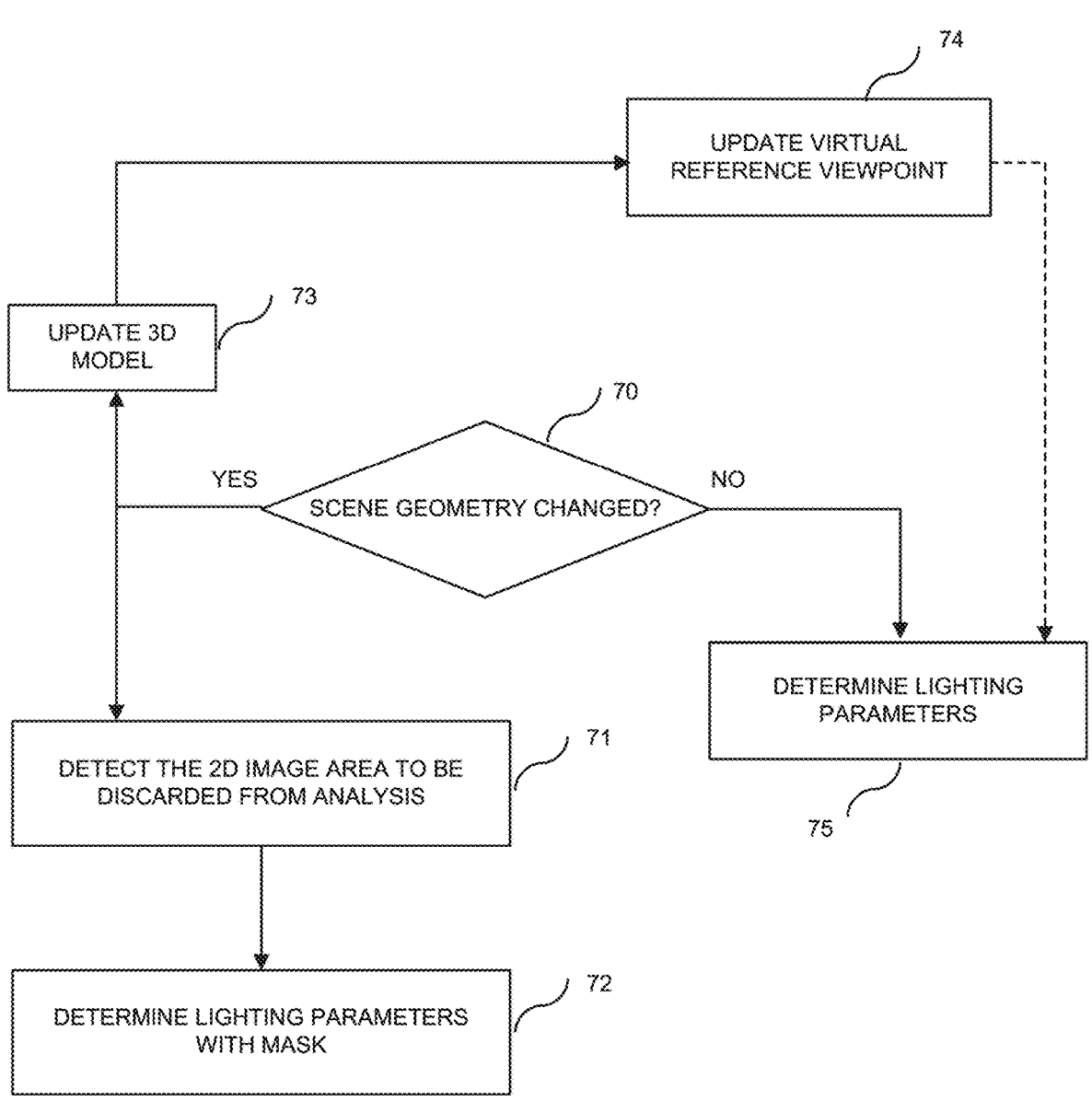
FIG. 7 illustrates an exemplary method for lighting parameters determination according to an embodiment of the present disclosure.

FIG. 7 illustrates an exemplary method for lighting parameters determination according to an embodiment of the present disclosure when geometry of the scene changes.

In step 70, geometry changes in the scene are detected. For instance, the current geometry of the scene is captured and compared with the currently stored 3D model.

If there is no signignificant change in the geometry, at step 75, lighting parameters determination is performed using the method discussed with FIG. 4. By significant, it should be understood here, a geometry change that has an impact on the virtual cast shadows associated to the current virtual reference viewpoint.

If there is a signignificant change in the geometry, at step 71, the new 3D model and the currently stored 3D model are projected onto the current viewpoint. The 2D areas that are impacted by the modification in the 3D scene are identifed. These 2D areas are discarded in the input images of the viewpoint, for instance by defining a mask identifying the discarded areas In step 72, lighting parameters determination is performed using the method discussed with FIG. 4, using the masks so that the discarded 2D areas are not analyzed in the input images.

Meanwhile, in step 73, the geometric model is updated.

Once the geometric model has been updated, in step 74, new virtual shadow maps are computed in the virtual reference viewpoint.

Once the new virtual shadow maps are ready, the 3D model is updated for all the tasks (including processing of the input frames), the updated virtual reference viewpoint is used, and the old stored virtual reference viewpoints are removed. Thus, the management of virtual reference viewpoints is re-initialized.

Then, at step 75, lighting parameters determination is performed using the method discussed with FIG. 4, without the masks defined at step 71 as the management of virtual reference viewpoints has been re-initialized.

Figure 8:
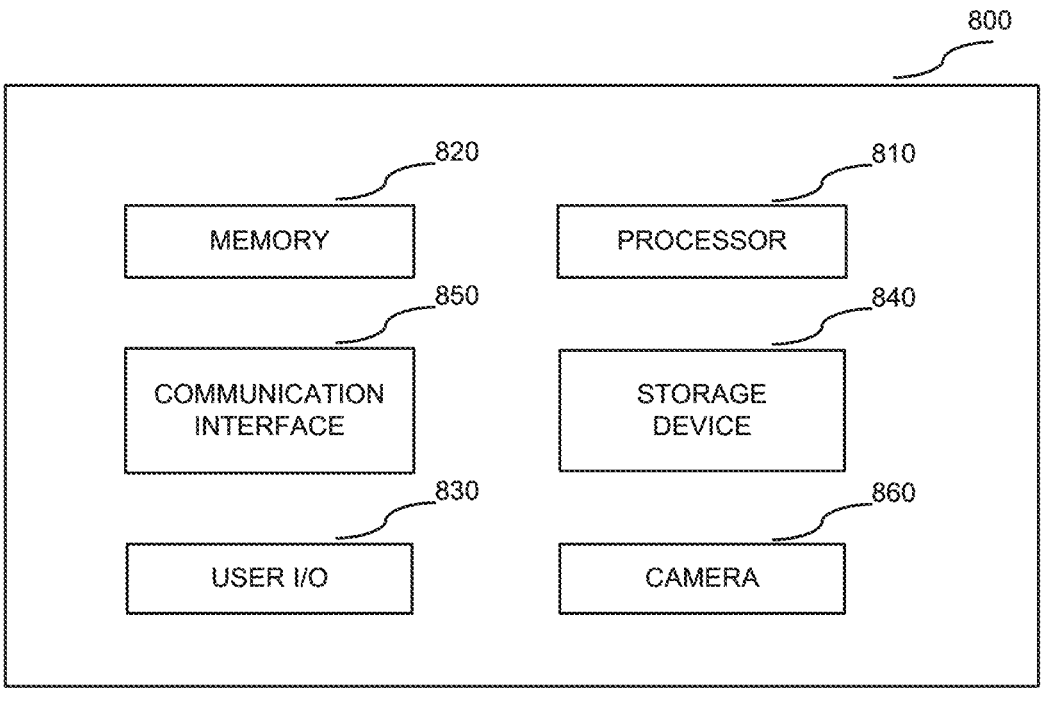
FIG. 8 illustrates an exemplary apparatus for processing a 3D scene according to an embodiment of the present disclosure.

FIG. 8 illustrates an exemplary apparatus for processing a 3D scene according to an embodiment of the present disclosure. FIG. 8 illustrates a block diagram of an exemplary system 800 in which various aspects of the exemplary embodiments may be implemented. The system 800 may be embodied as a device including the various components described below and is configured to perform the processes described above. Examples of such devices, include, but are not limited to, mobile devices, personal computers, laptop computers, smartphones, tablet computers, digital multimedia set top boxes, digital television receivers, personal video recording systems, connected home appliances, and servers. The system 800 may be communicatively coupled to other similar systems, and to a display via a communication channel.

Various embodiments of the system 800 include at least one processor 810 configured to execute instructions loaded therein for implementing the various processes as discussed above. The processor 810 may include embedded memory, input output interface, and various other circuitries as known in the art. The system 800 may also include at least one memory 820 (e.g., a volatile memory device, a non-volatile memory device). The system 800 may additionally include a storage device 840, which may include non-volatile memory, including, but not limited to, EEPROM, ROM, PROM, RAM, DRAM, SRAM, flash, magnetic disk drive, and/or optical disk drive. The storage device 840 may comprise an internal storage device, an attached storage device, and/or a network accessible storage device, as non-limiting examples.

Program code to be loaded onto one or more processors 810 to perform the various processes described hereinabove may be stored in the storage device 840 and subsequently loaded onto the memory 820 for execution by the processors 810. In accordance with the exemplary embodiments, one or more of the processor(s) 810, the memory 820, and the storage device 840, may store one or more of the various items during the performance of the processes discussed herein above, including, but not limited to real and virtual cast shadows map, input image, 3D scene geometry, virtual reference viewpoint's 3D pose, variables, operations, and operational logic.

The system 800 may also include a communication interface 850 that enables communication with other devices via a communication channel. The communication interface 850 may include, but is not limited to a transceiver configured to transmit and receive data from the communication channel. The communication interface 850 may include, but is not limited to, a modem or network card and the communication channel 850 may be implemented within a wired and/or wireless medium. The various components of the system 800 may be connected or communicatively coupled together (not shown) using various suitable connections, including, but not limited to internal buses, wires, and printed circuit boards.

The system 800 also includes user interactions means 830 coupled to the processor for receiving user inputs.

The system 800 also includes video capturing means 860, such as a camera, coupled to the processor for capturing video images.

The exemplary embodiments may be carried out by computer software implemented by the processor 810 or by hardware, or by a combination of hardware and software. As a non-limiting example, the exemplary embodiments may be implemented by one or more integrated circuits. The memory 820 may be of any type appropriate to the technical environment and may be implemented using any appropriate data storage technology, such as optical memory devices, magnetic memory devices, semiconductor-based memory devices, fixed memory, and removable memory, as non-limiting examples. The processor 810 may be of any type appropriate to the technical environment, and may encompass one or more of microprocessors, general purpose computers, special purpose computers, and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), tablets, and other devices that facilitate communication of information between end-users.

A method for processing a 3D scene is disclosed. Such a method comprises determining at least one virtual reference viewpoint in the 3D scene, obtaining a map of registered real cast shadows of objects in the 3D scene from an input image captured by a camera positioned at a viewpoint distinct from the virtual reference viewpoint, said map of real cast shadows being registered with regards to the virtual reference viewpoint, determining parameters for at least one light source in the 3D scene using the map of registered real cast shadows and at least one map of virtual shadows of objects in the 3D scene cast by the at least one light source from the virtual reference viewpoint.

According to the present principle, a virtual reference viewpoint is determined for determining lighting parameters. The virtual reference viewpoint may be selected to be close to the area where the video camera moves, in order to minimize the effect of the error on the 3D position of the virtual reference viewpoint and consequently the errors on the registered real shadow map. It can be for example a real viewpoint selected once it is captured.

The selected virtual viewpoint can then be kept as long as for example the overlapping between the camera's viewpoint and virtual viewpoint images is more than a percentage of pixels. Thus, on-line lighting parameters determination complexity is reduced, online 3d rendering processing is possible on mobile devices.

An apparatus for processing a 3D scene is also disclosed. Such an apparatus comprises means for determining at least one virtual reference viewpoint in the 3D scene, means for obtaining a map of registered real cast shadows of objects in the 3D scene from an input image captured by the camera positioned at a viewpoint distinct from the virtual reference viewpoint, said map of real cast shadows being registered with regards to the virtual reference viewpoint, means for determining parameters for at least one light source in the 3D scene using the map of registered real cast shadows and at least one map of virtual shadows of objects in the 3D scene cast by the at least one light source from the virtual reference viewpoint.

According to an embodiment of the present disclosure, obtaining the map of registered real cast shadows comprises detecting the real cast shadows in the input image to obtain a map of detected real cast shadows, and registering the map of detected real cast shadows with regards to the virtual reference viewpoint.

According to an embodiment of the present disclosure, obtaining the map of registered real cast shadows comprises registering the input image with regards to the virtual reference viewpoint to obtain a registered image, and detecting the real cast shadows in the registered image.

According to an embodiment of the present disclosure, using the map of registered real cast shadows and at least one map of virtual shadows of objects in the 3D scene cast by the at least one light source from the virtual reference viewpoint, comprises matching the map of registered real cast shadows and the at least one map of virtual shadows and selecting the map of virtual shadows that best matches the map of registered real cast shadows.

According to an embodiment of the present disclosure, the virtual reference viewpoint corresponds to a viewpoint from which a real scene represented by the 3D scene has been previously captured by the camera.

According to an embodiment of the present disclosure, the virtual reference viewpoint in the 3D scene is determined as being a viewpoint for which a number of pixels overlapping in an image captured from the virtual reference viewpoint and an image captured from the viewpoint of the camera is above a determined value.

According to an embodiment of the present disclosure, when the virtual reference viewpoint and the camera's viewpoint do not satisfy a determined criterion, a new virtual referenceviewpoint is determined.

According to an embodiment of the present disclosure, the virtual reference viewpoint and the camera's viewpoint do not satisfy the determined criterion if a number of pixels overlapping in an image captured from the virtual reference viewpoint and an image captured from the camera's viewpoint is below a determined value.

According to an embodiment of the present disclosure, the virtual reference viewpoint and the camera's viewpoint do not satisfy the determined criterion when a distance between the virtual reference viewpoint and the camera's viewpoint is above a determined value.

According to an embodiment of the present disclosure, the method for processing a 3D scene, further comprises comparing the poses of the virtual reference viewpoint and of the new virtual reference viewpoint with the camera poses, selecting among the virtual reference viewpoint and of the new virtual reference viewpoint, the virtual reference viewpoint closest to the camera's viewpoint, light source parameters in the 3D scene being determined with regards to the selected virtual reference viewpoint.

According to this embodiment, a new virtual reference viewpoint is pre-computed, stored and selected when needed.

According to an embodiment of the present disclosure, determining said at least one virtual reference viewpoint in the 3D scene, comprises detecting movement of the camera capturing the real scene, predicting a camera trajectory in the 3D scene as a function of the detected movement, said at least one virtual reference viewpoint being determined according to the predicted camera trajectory.

According to this embodiment, a new virtual reference viewpoint can be determined in advance by anticipating the movement of the user, and of the camera. In this way, computations of the virtual shadow maps with respect to the new virtual reference viewpoint can be carried out in advance before the new virtual reference viewpoint is needed.

According to an embodiment of the present disclosure, determining said at least one virtual reference viewpoint in the 3D scene comprises determining and storing at least one shadow map associated to a light source of a 3D scene. According to this embodiment, virtual shadow maps can be computed on the fly, before the virtual reference viewpoint to which they are assocaited is needed, and stored for future use. In that way, virtual shadow maps computation can be anticipated.

According to an embodiment of the present disclosure, the method for processing a 3D scene further comprises detecting geometry changes in the 3D scene, determining areas in the input image captured by the camera that are impacted by the geometry changes, said determined areas being discarded when determining parameters for at least one light source in the 3D scene using the virtual reference viewpoint until virtual shadow maps associated to the virtual reference viewpoint are updated based on the geometry changes.

According to the embodiment, geometry changes cna be taken into account when determining lighting parameters.

One or more of the present embodiments also provide a computer readable storage medium having stored thereon instructions for processing a 3D scene, according to any one of the embodiments of the method described above. The present embodiments also provide a computer program product including instructions for performing any one of the embodiments of the method described.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

What is claim is:

1. A method, comprising:
tracking a current viewpoint of a camera capturing an input image of at least one object in a 3D scene;
determining a reference viewpoint relative to the current viewpoint of the camera; and
determining a light source location, including:
obtaining a registered map of real cast shadows, wherein the map represents a shadow of the at least one object cast in the input image captured by the camera, and wherein the map is registered with respect to the reference viewpoint,
for candidates of light sources, obtaining respective maps of virtual shadows of the at least one object, wherein the maps of virtual shadows are created with respect to the reference viewpoint, and
determining the location of the light source based on the candidates of light sources with respective maps of virtual shadows that match the registered map of real cast shadows,
wherein the determining of the reference viewpoint comprises selecting the reference viewpoint out of a plurality of reference viewpoints, and
wherein the obtaining of the respective maps of virtual shadows comprises retrieving from storage the respective maps of virtual shadows, precomputed for the selected reference viewpoint.

2. The method of claim 1, further comprising:
storing the obtained respective maps of virtual shadows of the reference viewpoint.

3. The method of claim 1, wherein the selected reference viewpoint is the reference viewpoint closet to the current viewpoint of the camera.

4. The method of claim 1, wherein, if a previous reference viewpoint, previously determined for a tracked viewpoint of the camera, satisfies a determined criterion:
the determined reference viewpoint is the previous reference viewpoint; and the obtained respective maps of virtual shadows are maps of virtual shadows previously obtained for the previous reference viewpoint.

5. The method of claim 4, wherein the determined criterion is satisfied if a distance between the current viewpoint of the camera and the previous reference viewpoint is below a determined value.

6. The method of claim 1, wherein the determined criterion is satisfied if the number of corresponding pixels projected from the current viewpoint of the camera and from the previous reference viewpoint is above a determined value.

7. The method of claim 1, further comprising:
predicting a trajectory of the tracked camera;
determining another reference viewpoint relative to the predicted trajectory of the camera; and
for the candidates of light sources, obtaining respective maps of virtual shadows of the at least one object created with respect to the other reference viewpoint.

8. The method according to claim 1, wherein obtaining of the registered map of real cast shadows comprises:
detecting the real cast shadows from the input image to obtain a map of real cast shadows; and
projecting the map of real cast shadows with respect to the reference viewpoint.

9. The method according to claim 1, wherein obtaining of the registered map of real cast shadows comprises:
projecting the input image with respect to the reference viewpoint to obtain a registered image; and
detecting the real cast shadows from the registered image.

10. The method according to claim 1, further comprising:
detecting a change in the geometry of the 3D scene, and
determining areas in the input image that are impacted by the detected change, wherein the determined areas are discarded from the maps of virtual shadows during the determination of the light source location.

11. An apparatus, comprising:
at least one processor; and
memory storing instructions that, when executed by the at least one processor, cause the apparatus to:
track a current viewpoint of a camera capturing an input image of at least one object in a 3D scene,
determine a reference viewpoint relative to the current viewpoint of the camera, and
determine a light source location, including:
obtaining a registered map of real cast shadows, wherein the map represents a shadow of the at least one object cast in the input image captured by the camera, and wherein the map is registered with respect to the reference viewpoint,
for candidates of light sources, obtaining respective maps of virtual shadows of the at least one object, wherein the maps of virtual shadows are created with respect to the reference viewpoint, and
determining the location of the light source based on the candidates of light sources with respective maps of virtual shadows that match the registered map of real cast shadows,
wherein the determining of the reference viewpoint comprises selecting the reference viewpoint out of a plurality of reference viewpoints, and
wherein the obtaining of the respective maps of virtual shadows comprises retrieving from storage the respective maps of virtual shadows, precomputed for the selected reference viewpoint.

12. The apparatus of claim 11, wherein the instructions further cause the apparatus to:
store the obtained respective maps of virtual shadows of the reference viewpoint.

13. The apparatus of claim 11, wherein the selected reference viewpoint is the reference viewpoint closet to the current viewpoint of the camera.

14. The apparatus of claim 11, wherein, if a previous reference viewpoint, previously determined for a tracked viewpoint of the camera, satisfies a determined criterion:
the determined reference viewpoint is the previous reference viewpoint; and
the obtained respective maps of virtual shadows are maps of virtual shadows previously obtained for the previous reference viewpoint.

15. The apparatus of claim 14, wherein the determined criterion is satisfied if a distance between the current viewpoint of the camera and the previous reference viewpoint is below a determined value.

16. The apparatus of claim 14, wherein the determined criterion is satisfied if the number of corresponding pixels projected from the current viewpoint of the camera and from the previous reference viewpoint is above a determined value.

17. The apparatus of claim 11, wherein the instructions further cause the apparatus to:
predict a trajectory of the tracked camera;
determine another reference viewpoint relative to the predicted trajectory of the camera; and
for the candidates of light sources, obtain respective maps of virtual shadows of the at least one object created with respect to the other reference viewpoint.

18. A non-transitory computer-readable medium comprising instructions executable by at least one processor to perform a method, the method comprising:
tracking a current viewpoint of a camera capturing an input image of at least one object in a 3D scene;
determining a reference viewpoint relative to the current viewpoint of the camera; and
determining a light source location, including:
obtaining a registered map of real cast shadows, wherein the map represents a shadow of the at least one object cast in the input image captured by the camera, and wherein the map is registered with respect to the reference viewpoint,
for candidates of light sources, obtaining respective maps of virtual shadows of the at least one object, wherein the maps of virtual shadows are created with respect to the reference viewpoint, and
determining the location of the light source based on the candidates of light sources with respective maps of virtual shadows that match the registered map of real cast shadows,
wherein the determining of the reference viewpoint comprises selecting the reference viewpoint out of a plurality of reference viewpoints, and
wherein the obtaining of the respective maps of virtual shadows comprises retrieving from storage the respective maps of virtual shadows, precomputed for the selected reference viewpoint.

\* \* \* \* \*